United States Patent
Eiffert et al.

(10) Patent No.: US 7,487,771 B1
(45) Date of Patent: Feb. 10, 2009

(54) SOLAR PANEL FRAME ASSEMBLY AND METHOD FOR FORMING AN ARRAY OF CONNECTED AND FRAMED SOLAR PANELS

(75) Inventors: Patrina Eiffert, Golden, CO (US);
Annett Eiffert, Fair Oaks, CA (US);
Martin Rohm, Aurora, CO (US)

(73) Assignee: ImaginIt, Inc., Golden, CO (US)

( * ) Notice: Subject to any disclaimer, the term of this patent is extended or adjusted under 35 U.S.C. 154(b) by 405 days.

(21) Appl. No.: 11/236,122

(22) Filed: Sep. 26, 2005

Related U.S. Application Data

(60) Provisional application No. 60/613,057, filed on Sep. 24, 2004.

(51) Int. Cl.
*E04D 13/18* (2006.01)
*F16M 11/00* (2006.01)

(52) U.S. Cl. .................. 126/622; 126/450; 126/621; 126/633; 136/248; 136/438; 136/246

(58) Field of Classification Search ............ 126/622, 126/651, 621, 633; 403/291–298, 300–314; 136/248, 438
See application file for complete search history.

(56) References Cited

U.S. PATENT DOCUMENTS

| | | | |
|---|---|---|---|
| 4,132,570 A | 1/1979 | Caruso et al. | |
| 4,139,399 A | 2/1979 | Lindmayer | |
| 4,205,486 A * | 6/1980 | Guarnacci | 49/501 |
| 4,692,557 A | 9/1987 | Samuelson et al. | |
| 5,125,608 A * | 6/1992 | McMaster et al. | 248/163.1 |
| 5,205,486 A * | 4/1993 | Jung | 236/94 |
| 5,280,133 A | 1/1994 | Nath | |
| 5,647,915 A | 7/1997 | Zukerman | |
| 6,162,986 A | 12/2000 | Shiotsuka et al. | |
| 6,278,052 B1 | 8/2001 | Takehara et al. | |
| 6,346,670 B1 | 2/2002 | Fujii et al. | |
| 6,465,724 B1 | 10/2002 | Garvison et al. | |
| 6,515,215 B1 | 2/2003 | Mimura | |
| 6,545,211 B1 | 4/2003 | Mimura | |
| 6,653,549 B2 | 11/2003 | Matsushita et al. | |
| 6,688,303 B2 | 2/2004 | Davenport et al. | |
| 6,809,942 B2 | 10/2004 | Madenokouji et al. | |
| 6,858,791 B2 | 2/2005 | Erban | |
| 6,979,771 B2 | 12/2005 | Mimura | |
| 6,979,989 B2 | 12/2005 | Schripsema et al. | |
| 2003/0150444 A1 | 8/2003 | Cedenblad | |

(Continued)

FOREIGN PATENT DOCUMENTS

JP   2003005219   8/2004

(Continued)

*Primary Examiner*—Steven B McAllister
*Assistant Examiner*—Nikhil Mashruwala
(74) *Attorney, Agent, or Firm*—Holland & Hart LLP

(57) ABSTRACT

A solar panel frame assembly including a plurality of corner pieces and side extension pieces is disclosed. Each corner piece and side extension has an inner and outer side which terminate at their respective ends. The pieces interlock with each other at their ends to form a frame around the periphery of a solar panel. Adjacent corner pieces also interlock with each other along their outer sides so that a plurality of adjacent framed solar panels can be connected together to form an array of framed solar panels. A method for forming an array of connected and framed solar panels is also disclosed.

18 Claims, 4 Drawing Sheets

U.S. PATENT DOCUMENTS

| | | | |
|---|---|---|---|
| 2004/0011354 A1* | 1/2004 | Erling | 126/621 |
| 2004/0187909 A1* | 9/2004 | Sato et al. | 136/251 |
| 2006/0180196 A1 | 8/2006 | Lares et al. | |
| 2006/0289053 A1 | 12/2006 | Nieleck et al. | |
| 2007/0084501 A1 | 4/2007 | Kalberlah et al. | |

FOREIGN PATENT DOCUMENTS

| | | |
|---|---|---|
| JP | 2004190310 | 9/2004 |

* cited by examiner

SOLAR PANEL FRAME ASSEMBLY AND METHOD FOR FORMING AN ARRAY OF CONNECTED AND FRAMED SOLAR PANELS

CROSS REFERENCE TO RELATED APPLICATION

This application is a nonprovisional application claiming the benefit under 35 USC 119(e) of U.S. provisional application No. 60/613,057, filed on Sep. 24, 2004.

TECHNICAL FIELD

The present invention relates generally to mounting solar (photovoltaic, i.e. PV) panels on a roof or other surface and, more particularly, to mounting a plurality of solar panels in an array upon a roof and the like in a manner which extends the longevity of the roof, while collecting solar energy in a cost-effective manner.

BACKGROUND OF THE INVENTION

Photovoltaic modules, which convert sunlight into electrical power, are available in thin sheets of a rigid material, such as glass, plastic, metal, or some combination of these, and typically measure from one to four feet in width and one to six feet in length. A number of such modules typically are formed into arrays and mounted onto the roof of a building, with the electrical outputs of the array combined and processed before being used on site or fed into an electrical power grid.

Typically, glass solar modules are either, a) framed in aluminum, or b) installed without frames (also known as laminates). One problem commonly found with aluminum-framed modules is that the support structures for the modules often require additional grounding wires or other safety measures depending upon the installation configuration and local building codes. In addition, the non-framed photovoltaic modules (referred to as laminates above) are prone to edge chipping and cracking and in some cases the entire glass module has been known to break.

Current applications are also expensive to manufacture and install and in addition have inherent disadvantages and negative impacts upon the roof, including multiple roof penetrations and inadequate air circulation behind the solar panel which promotes unwanted vegetative mold growth on the roof and does not allow the solar panel to operate at cooler temperatures. Current applications also often require additional metal structural components to support the photovoltaic panels that require grounding wires to operate safely and in addition require a significant amount of time and labor to penetrate the roof and install support structures on the roof and then seal the roof penetrations.

DISCLOSURE OF THE INVENTION

Figure 1:
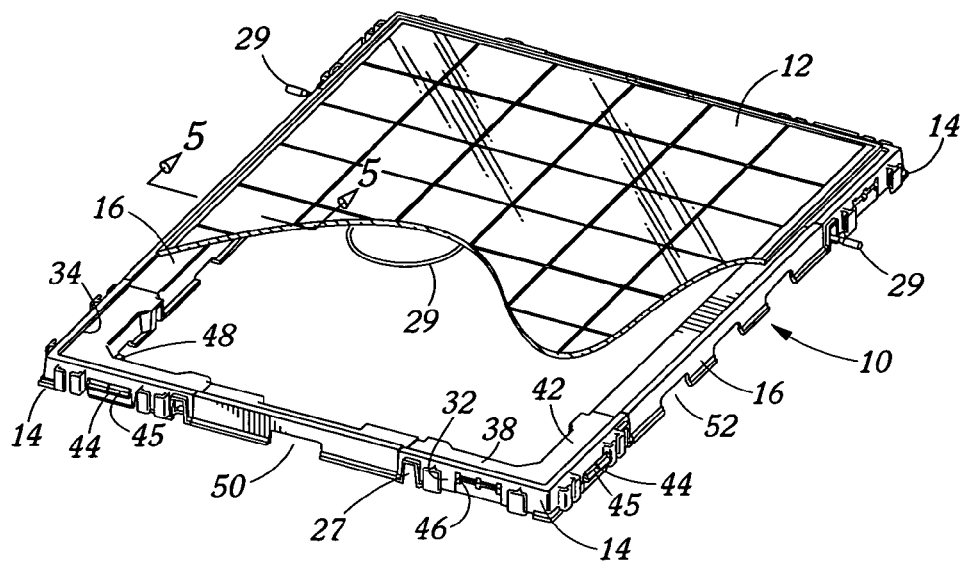
FIG. 1 is a perspective view of an embodiment of the present invention which illustrates a solar panel 12 having been framed with and secured to a frame assembly 10 of the present invention.

The present invention provides an improved and cost-effective assembly for framing a solar panel as well as an improved assembly for framing and connecting a plurality of solar panels together to form a connected array of solar panels. The frame assembly of the present invention protects the edges of solar panel laminates from damage and allows both the frame assembly and the solar panel laminates to be quickly secured together to form a solar array.

In general, the frame assembly of the present invention for framing and connecting adjacent solar panels together includes a plurality of generally elongate frame sections, each of which defines an inner and outer side which respectively terminate at the ends of the frame section. The frame sections interconnect with each other at their ends to form a frame around the periphery of each solar panel. The frame sections also interconnect with each other along their outer sides to connect adjacent solar panels together.

In preferred embodiments, the base of the frame of the present invention is angled and provided with openings to allow natural water flow and drainage along the roof surface. This inhibits the growth of toxic molds on the roof as well as the occurrence of damaging freeze/thaw cycles on the roof.

The method of the present invention for forming an array of connected and framed solar panels comprises providing a plurality of generally elongate frame sections, as discussed above, and solar panels and then connecting, preferably locking, the frame sections to each other at their ends to frame each solar panel. The outer sides of the frame sections of the framed solar panels are then connected, preferably locked, together to form an array of connected and framed solar panels. In addition, the frame sections are preferably made from a lightweight polymeric material to eliminate the need for electrical grounding of the frame sections.

The polymeric frame assembly of the present invention makes it faster and easy to assemble and mount photovoltaic solar panels (also referred to as solar modules) on a roof as well as weigh down the perimeter of an array of solar panels with pavers, gravel or other ballast material, necessitating at the most only a few penetrations into the roof surface on which they are positioned to secure the array to the roof. In accordance with the present invention, one or more solar panels or modules are framed by each frame assembly (also referred to as a tile) of the present invention and then multiple tiles are interconnected to form a photovoltaic array. In assembling the photovoltaic array, five main functions are performed by the polymer-framing tile. The five functions include: 1) Protecting each solar panel or module, 2) Securing the solar module within the tile, 3) Interconnecting both the solar modules and framing tiles to form a unified solar array, 4) Locking and spacing the solar panels within the array, allowing for thermal expansion and contraction, while not inhibiting water drainage and air flow beneath the solar energy system, and 5) Providing a modular solar covering which additionally supplies UV protection from the sun and thermal insulation to the roof or other surface underneath.

DETAILED DESCRIPTION OF THE DRAWINGS

Figure 2:
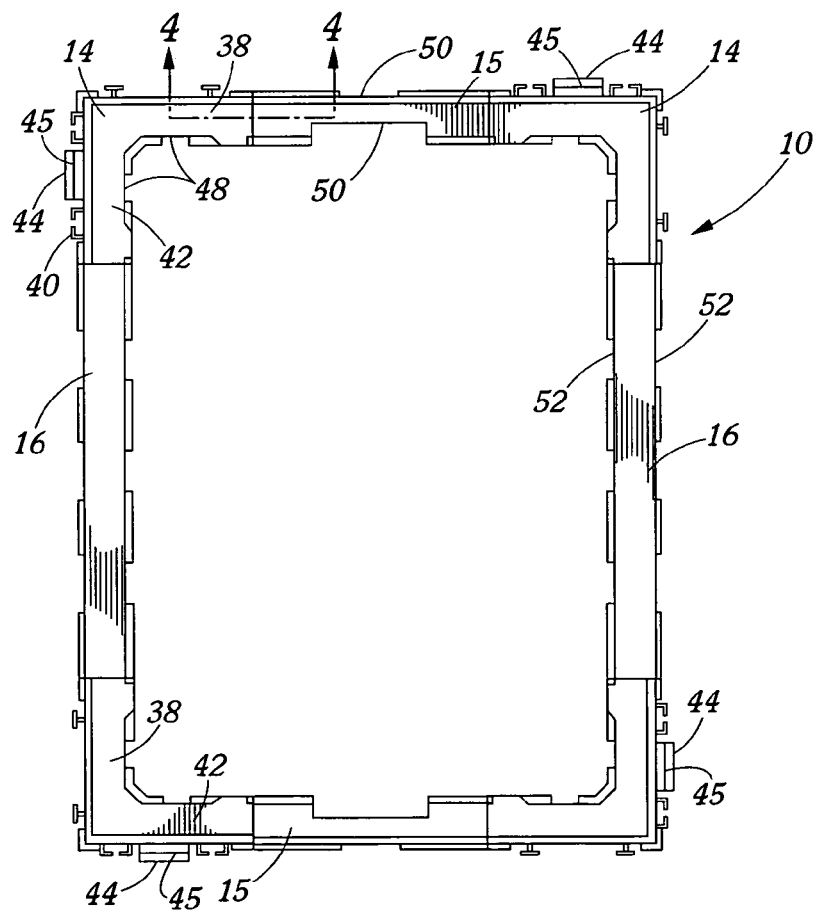
FIG. 2 is a top plan view of FIG. 1.
Figure 6:
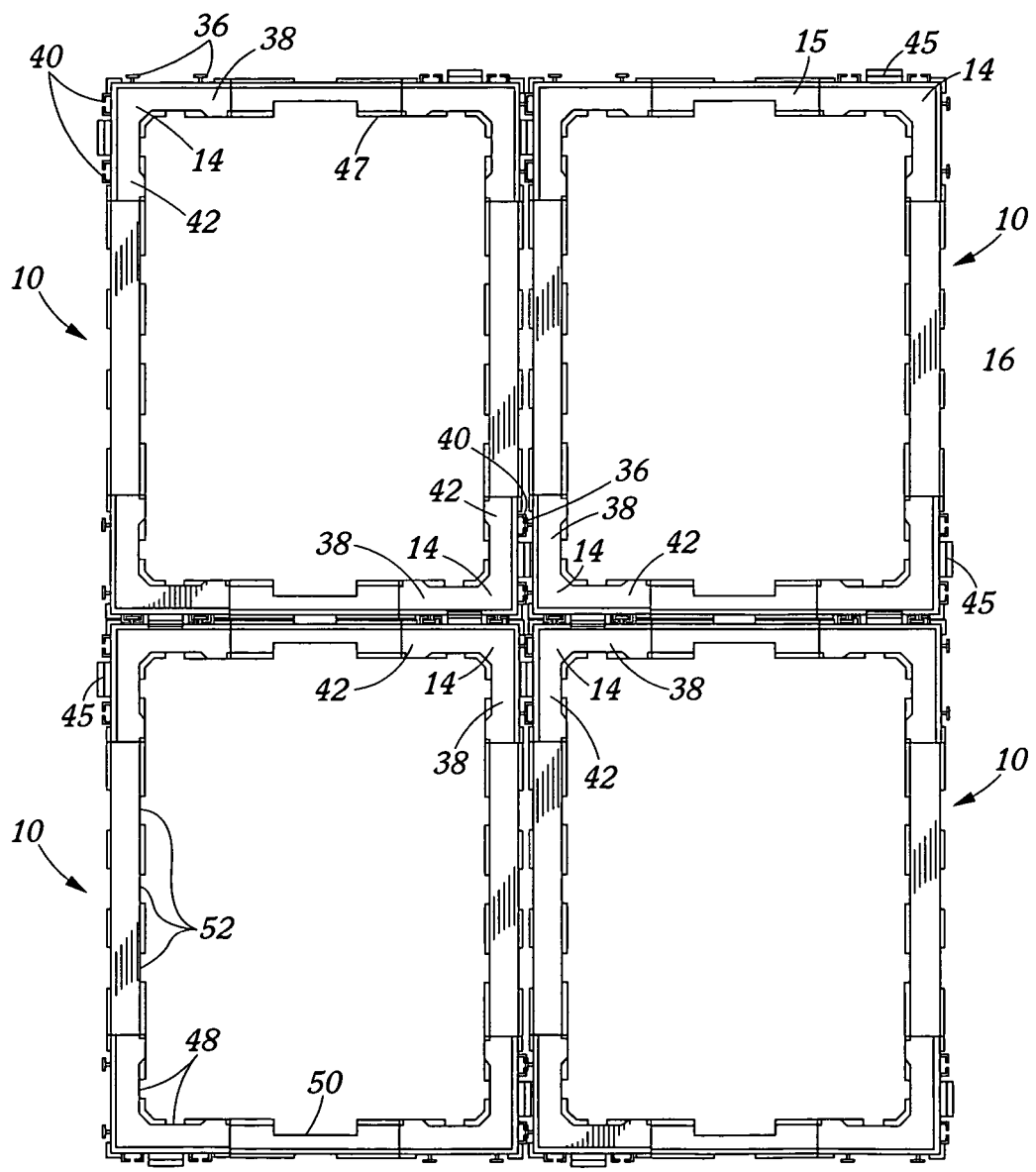
FIG. 6 is a top plan view of a plurality of solar panels connected together with the frame assembly of the present invention.

FIGS. 1 and 2 illustrate a frame assembly 10 of the present invention for framing a solar panel or module 12. FIG. 6 illustrates a plurality of frame assemblies 10 connected to each other for connecting a plurality of adjacent solar panels 12 together to form an array of solar panels. The solar panels are not shown in FIG. 6. However, it will be appreciated that each frame assembly 12 would be framing a separate solar panel as shown in FIG. 1 so that the four frame assemblies shown in FIG. 6 would be connecting four solar panels 12.

Figure 3:
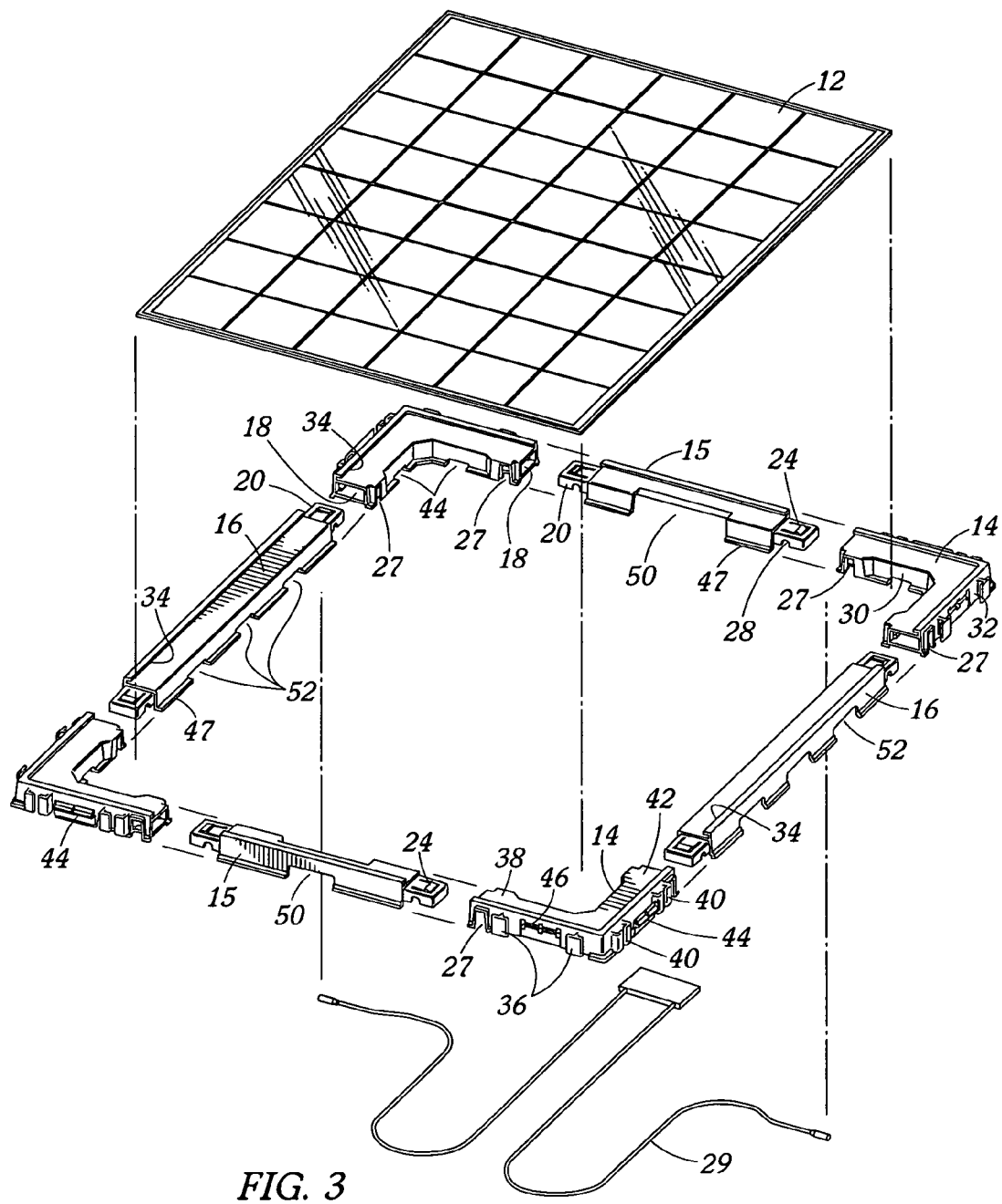
FIG. 3 is an exploded perspective view of the framed assembly and solar panel of FIG. 1.

Turning now to FIG. 3 which provides an exploded view of frame assembly 10, it will be appreciated that the frame assembly comprises a plurality of elongate frame sections (not numbered) which are referred to respectively as corner pieces 14 and short and long side extension pieces 15, 16. FIG. 3 shows that each corner piece 14 has female connectors 18 at its ends and that each side extension piece 15, 16 has male connectors 20 at their ends.

Figure 4:
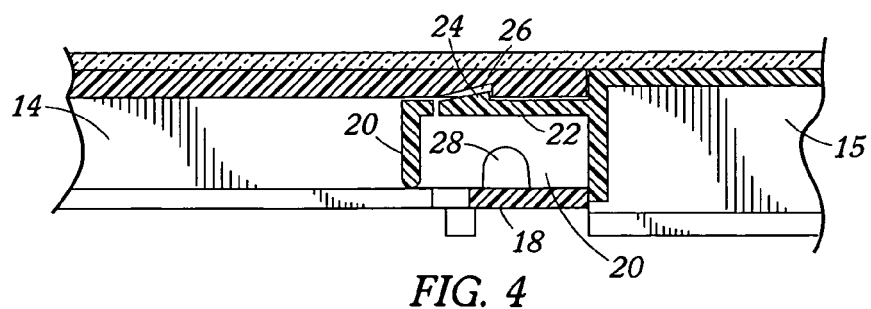
FIG. 4 is a cross-sectional view taken along lines 4-4 of FIG. 2.

FIG. 4 shows a male connector 20 received in a female connector 18. FIG. 4 also shows that the male and female connectors snap together (so as to provide a locked snap fit connection) by virtue of a resilient depressible tab 22 provided in male connector 20 which has a catch 24 at its free end which snaps into a notch 26 provided in the female connector to lock the pieces together. To release or separate a corner piece from an extension piece, a screwdriver type tool is slid in between the catch 24 and the notch 26 to separate the catch from the notch. When separated, the corner piece and respective side extension piece can be pulled apart.

As shown in FIGS. 1 and 3, each corner piece is further provided with wire ports 27 in its inner and outer sides 30, 32 at the corner piece's ends. The wire ports align with a pair of notches 28 provided in the male connector (see FIG. 4) when the male connector is inserted into the female connection. As such, a passageway for the solar panels' electrical wiring 29 is provided which as shown in FIG. 1 passes through wire ports 27 and notches 28.

Figure 5:
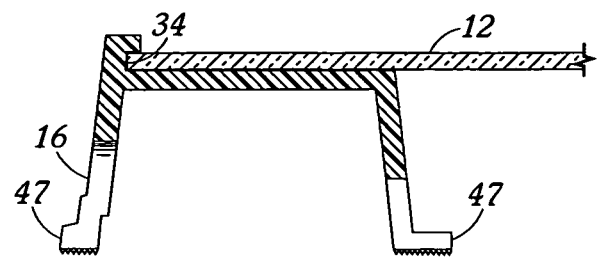
FIG. 5 is a cross-sectional view taken along lines 5-5 of FIG. 1.

FIG. 5 is a cross-sectional view of a side extension piece 16 taken along lines 5-5 of FIG. 1. FIG. 5 shows that the side extension piece defines a channel 34 for receiving an edge of the solar panel it is framing. FIGS. 1 and 3 illustrate that the corner pieces 14 define a similar channel 34 for receiving the edge of the solar panel. Accordingly, those skilled in the relevant art will appreciate that when a solar panel 12 is completely framed with all corner pieces 14 and side extensions 15, 16, the edges of the solar panel will be received in channels 34 of the corner pieces and the side extension, thereby securely attaching the solar panel to the frame assembly.

Figure 7:
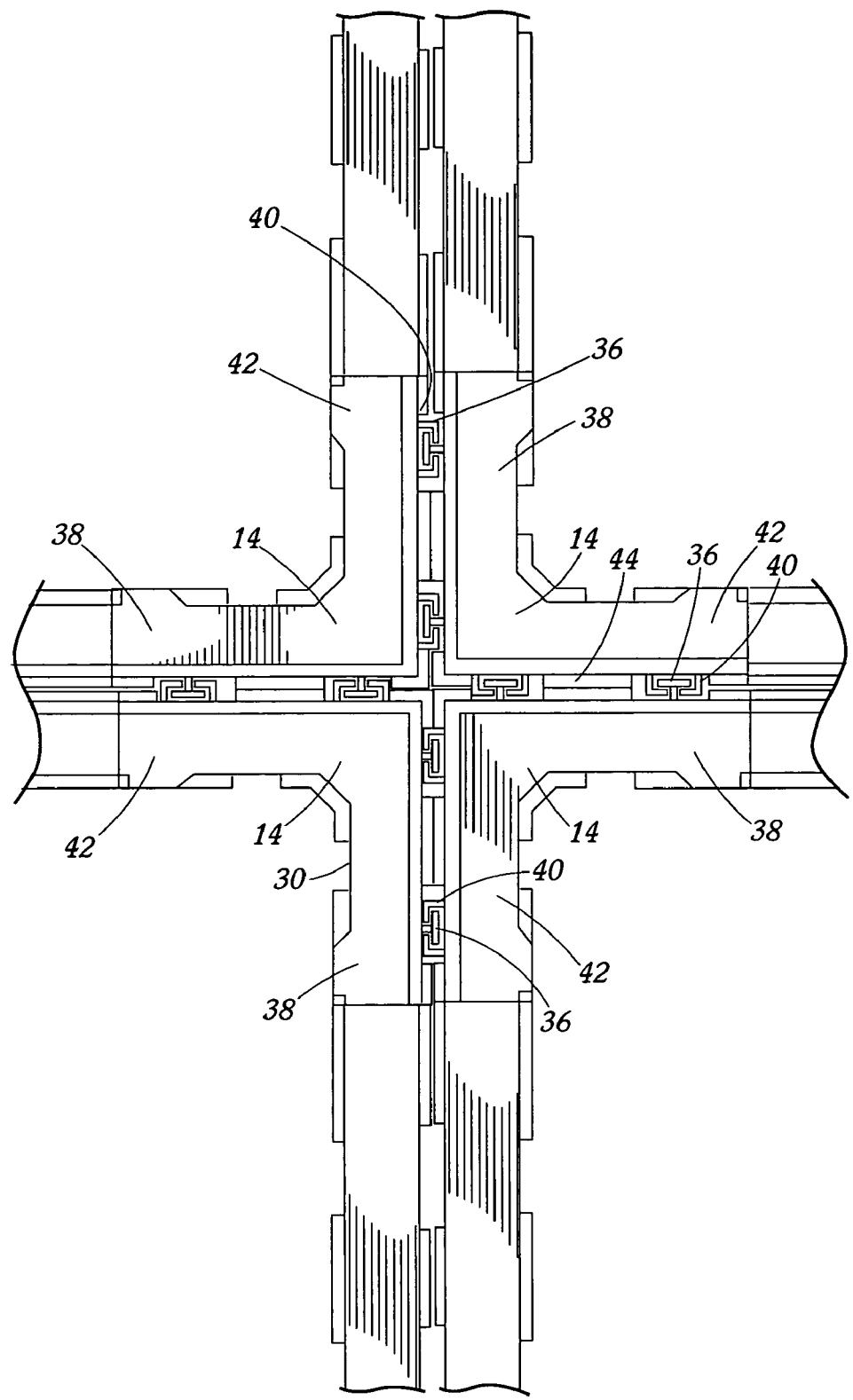
FIG. 7 is an enlarged view of the circled section of FIG. 6.

Turning now to FIGS. 3, 6 and 7, it is shown that each corner piece 14 is provided with a pair of T-shaped projections 36 projecting from the outer side of its first section 38 and a pair of slotted elongated openings or slots 40 provided in the outer side of its second section 42. As shown in FIGS. 6 and 7, the T-shaped projections of one corner piece are received in the slotted elongated openings or slots 40 of an adjacent corner piece such that each corner piece is capable of interconnecting with two adjacent corner pieces, one along its first section 38 and another along its second section 42. Accordingly, those skilled in the relevant art will appreciate that the interconnecting corner pieces can connect an entire array of solar panels together; indeed, many more than the four solar panels illustrated in FIG. 6. In addition, by connecting the panels together in this way, separation or horizontal movement of the panels away from each other is prevented. While not shown, side extensions 15, 16 could also be provided with projections 36 and slots 40 and corner pieces 14 could be provided with a projection 36 and a slot 40 on each first and second section 38 and 42. As so constructed, those skilled in the relevant art will appreciate that the corner pieces and side extensions could interconnect with each other to form the desired connected array of solar panels. Other means for interconnecting either the corner pieces and/or the side extensions are also possible and are considered to be within the scope of the prevent invention.

FIGS. 3 and 6 also illustrate that each corner piece 14 is provided with a resilient snap fit male locking tab member 44 having a catch 45 located between its slots 40. In addition, each corner piece is also provided with a corresponding female locking notch 46 located between its projections 36. As those skilled in the art will appreciate, catch 45 of the male locking tab member of a corner piece is lockingly received in the female locking notch 46 of an adjacent corner piece to lock the pieces together when the male projections 36 of one corner piece are slidingly received in the female slots 40 of an adjacent corner piece, as such is shown in FIG. 6. This type of locking prevents or at least limits vertical movement of the panels relative to each other or in other words it insures that the panels lie in the same plane. When a plurality of framed solar panels are locked together as described, an array of solar panels is provided in which all solar panels are securely and rigidly attached to each other. To release or separate a pair of corner pieces locked together, a screwdriver type tool is slid in between catch 45 and notch 46 to separate the catch from the notch. When so separated, the corner pieces can be separated from each other by sliding the T-shaped projections 36 out of the slots 40 of the adjacent corner piece.

Turning now to FIG. 5, it will be appreciated that corner pieces 14 and side extensions 15, 16 are generally hollow and provided with an open bottom having feet 47 as shown in FIG. 5. The feet 47 are provided with nub extrusions or projections (as shown but not numbered) to grip the roof surface and thereby inhibit movement of the panel along the roof which might occur as the polymeric material of the frame assembly thermally expands and contracts.

As also shown in the cross-sectional view of FIG. 5, the actual shape of the corner piece and side extension pieces is what is can be described as an upside down U-Shape with slightly angled sides. By providing slightly angled sides as illustrated, the strength of the pieces is enhanced. In fact, if has been found that a pair of parallel extension pieces and their respective corner pieces are strong enough to be walked upon by an installer. The angled sides also allow the pieces to be nested within each other (i.e. stacked) which saves on storage space and allows more pieces to be packaged in a standard sized shipping box or stacked upon each other in a nested manner for ease, strength and security for shipping tiles on pallets.

It can also be seen from the figures that the inner and outer sides of corner pieces 14 and side extensions 15, 16 are provided with openings 48, 50 and 52, respectively. These openings allow water and heat to drain and/or escape out through the openings. Heat buildup can reduce electrical performance during a hot sunny afternoon since the solar panels are typically mounted on a flat surface such as a roof and pointed directly at the sun. Accordingly, the openings provide a convection avenue for the heat radiating off the roof to escape. Similarly, if water is trapped by the solar panel assembly and allowed to collect on the roof, toxic molds can grow on the roof and ultimately degrade the roof prematurely. Accordingly, those skilled in the relevant art will appreciate that openings 48-52 also provide an avenue for rain water (and melting snow, etc.) to escape and/or evaporate, thereby preventing the growth of toxic molds on the roof.

While a preferred embodiment of the present invention has been shown and described, it is to be understood that this was done only by way of example, and not as a limitation upon the scope of the invention.

We claim:

1. An assembly for framing and connecting adjacent solar panels together, said assembly comprising:
    a plurality of generally elongate frame sections, each of which has an inner and outer side which terminate at the ends of the frame section, said frame sections interconnecting with each other at their ends to form a frame around the periphery of each solar panel, said frame section also interconnecting with each other along their outer sides to connect adjacent solar panels together;

wherein the outer sides of said frame sections include a T-shaped male connector projecting from the outer side of said frame sections and a slotted elongate opening female connector provided in the outer side of said frame section for interconnecting with corresponding male and female connectors provided on the outer sides of said frame sections of adjacent solar panels.

2. The solar panel frame assembly as claimed in claim 1 made from polymeric material.

3. The solar panel frame assembly as claimed in claim 1 wherein each frame section defines a channel for receiving an edge of the solar panel it is framing.

4. An assembly for framing and connecting adjacent solar panels together, said assembly comprising:
a plurality of generally elongate frame sections, each elongate section including a corner piece and a side extension piece and each of the which has an inner and outer side which terminate at the ends of the frame section, said frame sections interconnecting with each other at their ends to form a frame around the periphery of each solar panel, said frame sections also interconnecting with each other along their outer sides to connect adjacent solar panels together;
wherein each said corner piece has female connectors at its ends provided with a notch and each said side extension piece has male connectors at its ends provided with a resilient depressible tab having a catch at its free end and wherein the catch snaps into the notch when the male connector is inserted into the female connector.

5. The solar panel frame assembly as claimed in claim 4 made from polymeric material.

6. The solar panel frame assembly as claimed in claim 4 wherein each frame section defines a channel for receiving an edge of the solar panel it is framing.

7. An assembly for framing and connecting adjacent solar panels together, said assembly comprising:
a plurality of generally elongate frame sections, each of which has an inner and outer side which terminate at the ends of the frame section, said frame sections interconnecting with each other at their ends to form a frame around the periphery of each solar panel, said frame section also interconnecting with each other along their outer sides to connect adjacent solar panels together;
wherein each frame section is generally hollow and provided with an open bottom.

8. An assembly for framing and connecting adjacent solar panels together, said assembly comprising:
a plurality of generally elongate frame sections, each of which has an inner and outer side which terminate at the ends of the frame section, said frame sections interconnecting with each other at their ends to form a frame around the periphery of each solar panel, said frame section also interconnecting with each other along their outer sides to connect adjacent solar panels together;
wherein openings are provided in the inner and outer sides of each frame section.

9. A solar panel frame assembly comprising:
a plurality of corner pieces and side extension pieces, each of which has an inner and outer side which terminate at their respective ends, said pieces interlocking with each other at said ends to form a frame around the periphery of a solar panel, each said corner, piece also being capable of interlocking along its outer side with a corner piece of an adjacent solar panel so that a plurality of adjacent framed solar panels can be connected together to form an array of framed solar panels;
wherein the cross-section of each corner piece and side extension piece has an upside down U-Shape with the open end of the U forming the bottom of the frame assembly.

10. The solar panel frame assembly as claimed in claim 9 wherein each said corner piece is provided with a female connector on its outer side which is sized and configured to receive a male connector provided in the outer side of an adjacent solar panel so that when said male connectors of framed adjacent solar panels are received in said female connectors of adjacent framed solar panels said adjacent framed solar panels will be connected to each other.

11. The solar panel frame assembly as claimed in claim 9 wherein each said corner piece has female connectors at its ends and each said side extension piece has male connectors at its ends, said male connectors being received in said female connectors to connect said male and female connectors together.

12. The solar panel frame assembly as claimed in claim 11 wherein connection between said male and female connectors is a snap fit to lock said connectors together.

13. The solar panel frame assembly as claimed 9 wherein each corner piece and side extension piece defines a channel for receiving an edge of the solar panel it is framing.

14. A solar panel frame assembly comprising:
a plurality of corner pieces and side extension pieces, each of which has an inner and outer side which terminate at their respective ends, said pieces interlocking with each other at said ends to form a frame around the periphery of a solar panel, each said corner piece also being capable of interlocking along its outer side with a corner piece of an adjacent solar panel so that a plurality of adjacent framed solar panels can be connected together to form an array of framed solar panels;
wherein openings are provided in the inner and outer sides of each corner piece and side extension piece.

15. The solar panel frame assembly as claimed in claim 14 wherein each said corner piece is provided with a female connector on its outer side which is sized and configured to receive a male connector provided in the outer side of an adjacent solar panel so that when said male connectors of framed adjacent solar panels are received in said female connectors of adjacent framed solar panels said adjacent framed solar panels will be connected to each other.

16. The solar panel frame assembly as claimed in claim 14 wherein each said corner piece has female connectors at its ends and each said side extension piece has male connectors at its ends, said male connectors being received in said female connectors to connect said male and female connectors together.

17. The solar panel frame assembly as claimed in claim 16 wherein connection between said male and female connectors is a snap fit to lock said connectors together.

18. The solar panel frame assembly as claimed 14 wherein each corner piece and side extension piece defines a channel for receiving an edge of the solar panel it is framing.

* * * * *